US008529812B2

(12) United States Patent
Estur et al.

(10) Patent No.: US 8,529,812 B2
(45) Date of Patent: Sep. 10, 2013

(54) PRODUCTION OF PEARLS BASED ON EXPANDED POLYMERS

(75) Inventors: Jean-Francois Estur, Saint-Genis Laval (FR); Eric Roche, Luzinay (FR); Jean-Francois Briois, Croix-en-Ternois (FR)

(73) Assignee: Rhodia Polyamide Intermediates, Saint Fons Cedex (FR)

( * ) Notice: Subject to any disclaimer, the term of this patent is extended or adjusted under 35 U.S.C. 154(b) by 0 days.

(21) Appl. No.: 10/562,047

(22) PCT Filed: Jun. 30, 2004

(86) PCT No.: PCT/FR2004/001681
§ 371 (c)(1),
(2), (4) Date: Aug. 8, 2006

(87) PCT Pub. No.: WO2005/011952
PCT Pub. Date: Feb. 10, 2005

(65) Prior Publication Data
US 2007/0036967 A1 Feb. 15, 2007

(30) Foreign Application Priority Data
Jul. 4, 2003 (FR) .................................... 03 08210

(51) Int. Cl.
*B29B 9/06* (2006.01)
*B29D 7/00* (2006.01)

(52) U.S. Cl.
USPC ........... 264/142; 264/140; 264/141; 264/143; 264/45.9; 264/46.1; 264/51; 264/54; 264/331.19; 428/304.4; 428/318.4

(58) Field of Classification Search
None
See application file for complete search history.

(56) References Cited

U.S. PATENT DOCUMENTS

| | | | | | |
|---|---|---|---|---|---|
| 2,918,701 | A | * | 12/1959 | Schrader et al. | 264/142 |
| 3,089,857 | A | * | 5/1963 | Pottenger | 521/60 |
| 3,655,542 | A | * | 4/1972 | Tamai et al. | 521/50.5 |
| 3,709,806 | A | * | 1/1973 | Minami et al. | 521/50.5 |
| 4,483,809 | A | * | 11/1984 | Ando et al. | 264/53 |
| 4,644,013 | A | * | 2/1987 | Fujie et al. | 521/60 |
| 4,838,775 | A | * | 6/1989 | Hunke | 425/67 |
| 5,000,891 | A | | 3/1991 | Green | |
| 5,059,103 | A | * | 10/1991 | Bruckmann et al. | 425/67 |
| 5,215,763 | A | * | 6/1993 | Mattera | 425/311 |
| 5,234,640 | A | * | 8/1993 | Amano et al. | 264/55 |
| 5,284,433 | A | * | 2/1994 | Cates et al. | 425/313 |
| 5,324,753 | A | * | 6/1994 | Lesca et al. | 521/79 |
| 5,744,505 | A | * | 4/1998 | Fischer et al. | 521/60 |
| 5,814,350 | A | * | 9/1998 | Rockstedt | 425/67 |
| 5,942,170 | A | * | 8/1999 | Peitz | 264/40.6 |
| 6,306,921 | B1 | * | 10/2001 | Al Ghatta et al. | 521/182 |
| 6,315,931 | B1 | * | 11/2001 | Bruning et al. | 264/53 |
| 6,361,724 | B1 | * | 3/2002 | Maeda et al. | 264/85 |
| 6,592,350 | B1 | * | 7/2003 | Chszaniecki | 425/67 |
| 2003/0100086 | A1 | * | 5/2003 | Yao et al. | 435/177 |

FOREIGN PATENT DOCUMENTS

| | | |
|---|---|---|
| DE | 10226202 A1 | 2/2003 |
| EP | 0450205 B1 | 10/1991 |
| WO | WO 03/053651 A1 | 7/2003 |

OTHER PUBLICATIONS

International Search Report Corresponding to PCT/FR 2004/001681, Issued on Jan. 18, 2005, 5 Pages.

* cited by examiner

*Primary Examiner* — Jeffrey Wollschlager
(74) *Attorney, Agent, or Firm* — Dentons US LLP

(57) ABSTRACT

Pearls based on expanded polymers are produced by extruding an expandable composition containing a thermoplastic polymer and an expanding agent, and thereafter cooling and chopping the expanded material thus obtained.

13 Claims, 2 Drawing Sheets

PRODUCTION OF PEARLS BASED ON EXPANDED POLYMERS

CROSS-REFERENCE TO PRIORITY/PCT APPLICATIONS

This application claims priority under 35 U.S.C. §119 of FR 03/08210, filed Jul. 4, 2003, and is the National Phase of PCT/FR 2004/001681, filed Jun. 30, 2004 and designating the United States, published on Feb. 10, 2005 as WO 2005/011952 A2, each hereby expressly incorporated by reference and each assigned to the assignee hereof.

The present invention relates to a process for preparing an article based on expanded polymer. The invention relates more particularly to a process for preparing a pearl based on expanded polymer.

Expanded synthetic materials are used in many fields, such as heat or sound insulation, upholstery, etc.

Essentially two types of expanded material, also known as foams, are distinguished: structural foams and nonstructural foams.

Structural foams are rigid foams composed of a low-density core and a skin whose density is close to that of the polymer of which the matrix is composed. These foams may be used as lightened structures in the field of aeronautics or motor vehicles, for example.

Nonstructural foams may be flexible or rigid. The rigid foams are used in the field of heat insulation (the gas present in the cells acts as the insulating agent). Flexible foams are used in the field of furniture and upholstery, for their compressibility and shock-absorbing properties, in the field of packaging on account of their low weight, and also in the field of sound insulation (foams with an open porosity have the particular feature of absorbing certain frequencies).

Various methods are known for obtaining thermoplastic polymer foams, such as polystyrene, PVC, polyethylene, polypropylene, etc. foams and especially polyamide foams.

It is known practice to inject pressurized gases into the polymer melt.

It is also known practice to incorporate pore-forming agents—heat-unstable fillers—into the polymer melt, which release a gas during their decomposition.

It is also possible to dissolve or disperse compounds into the polymer melt, the foam being obtained by volatilization of these compounds.

Finally it is known practice to obtain foams by means of a chemical reaction in which gas is evolved, for instance carbon dioxide. This is the case, for example, for the polyurethane foams obtained by reaction between isocyantes, polyols and water leading to the formation of polyurethane with release of carbon dioxide.

Polyamide foams may also be obtained chemically, by placing isocyanates and lactams in contact, along with bases to activate the anionic polymerization.

These thermoplastic polymer foams, and especially polyamide foams, are generally formed by molding, for example by injection-molding. The articles thus obtained are generally used in the form as produced, for various applications.

For certain applications, the expanded polymer material is introduced into other materials. This is the case especially in the field of lightened materials, such as lightened concrete. An expanded material in an easy to handle form, which is dispersible in the matrix, etc., is sought in applications of this type. Acicular fillers are known for this type of application. However, their shape is detrimental especially in terms of viscosity during their introduction into the matrix, which limits, for example, the amount of fillers that it is possible to incorporate into the matrix. The spherical shape of the fillers incorporated, for example, into concrete, thus presents an advantage: they also allow optimization of the stacking in the material.

Furthermore, for certain specific applications such as lightened concretes, an article made of expanded material that has a closed porosity is desired, in order especially to avoid absorption of water by the article made of expanded material, during the preparation of the concrete.

The present invention proposes, in a first subject, a process for preparing a pearl based on expanded polymer and with a continuous skin, comprising the following successive steps:
  a) extruding through a die an expandable composition comprising a thermoplastic polymer and an expanding agent, in melt form, to produce the expansion
  b) cooling and chopping the expanded material directly at the die outlet using a knife.

The invention also relates to a pearl based on expanded polyamide and having a continuous skin.

The term "pearl" means a small article whose largest dimension is less than or equal to 15 mm. The term "pearl" preferably means a spherical or essentially spherical article.

The term "pearl having a continuous skin" means a pearl that does not have any surface porosity. Preferably, the term "pearl having a continuous skin" means a pearl that does not have any porosity by observation with a scanning electron microscope up to a magnification of at least 5000.

Any thermoplastic polymer may be used in the context of the invention. Examples of thermoplastic polymers that may be mentioned include polyamides, polyesters, polyurethanes, polyolefins such as polyethylene or polyproylene, polystyrene, etc.

According to one particular embodiment of the process of the invention, the thermoplastic polymer is a polyamide.

Any polyamide known to those skilled in the art may be used in the context of the invention. The polyamide is generally a polyamide of the type obtained by polycondensation using dicarboxylic acids and diamines, or of the type obtained by polycondensation of lactams and/or amino acids. The polyamide of the invention may be a blend of polyamides of different types and/or of the same type, and/or copolymers obtained from different monomers corresponding to the same type and/or to different types of polyamide.

As examples of polyamides that may be suitable for the invention, mention may be made of polyamide 6, polyamide 6,6, polyamide 11, polyamide 12, polyamides 4,6; 6,10; 6,12; 12,12, 6,36; semiaromatic polyamides, for example the polyphthalamides obtained from terephthalic acid and/or isophthalic acid, such as the polyamide sold under the trade name AMODEL, and copolymers and alloys thereof.

According to one preferential embodiment of the invention, the polyamide is chosen from polyamide 6 and polyamide 6,6, and blends and copolymers thereof.

Any expandable composition comprising a thermoplastic polymer and an expanding agent may be used in the context of the invention, as may any method for preparing it.

According to a first particular embodiment of the process of the invention, the expanding agent is a gas that can disperse or dissolve in the polymer melt. The composition according to this embodiment is generally prepared by introducing the gas into the polymer melt, according to a method known to those skilled in the art. Any gas known to those skilled in the art that can become dispersed or dissolved in the polymer of the invention may be used. The gas is preferably inert. Examples that may be mentioned of gases that are suitable in the context of the invention include nitrogen, carbon dioxide, butane, etc.

According to a second particular embodiment of the process of the invention, the expanding agent is a pore-forming agent. Any pore-forming agent known to those skilled in the art may be used. It is introduced into the polymer according to a method known to those skilled in the art. An example of a pore-forming agent that may be mentioned is diazocarbonamide. According to this particular mode, the temperature during step a) is preferably greater than or equal to the decomposition temperature of the pore-forming agent.

According to a third particular embodiment of the process of the invention, the expanding agent is a volatile compound that can dissolve in the polymer melt. The composition according to this embodiment is generally prepared by introducing the volatile compound into the polymer melt, according to any method known to those skilled in the art. Any volatile compound known to those skilled in the art that can be dissolved in the polymer of the invention may be used. An example that may be mentioned of a volatile compound that is suitable in the context of the invention is butanol.

According to a fourth particular embodiment of the process of the invention, the expanding agent is chemical compound that can react chemically with the polymer by heating. A gas is generally generated during this reaction, this gas being the cause of the expansion of the blend. These chemical compounds are known to those skilled in the art. Mention may be made, for example, of polycarbonate, which reacts with the polyamide and decomposes to generate carbon dioxide. The chemical reaction takes place during step a). Any method known to those skilled in the art for preparing the composition may thus be used. It is possible, for example to prepare an intimate mixture of the powders of the polymer and of the chemical compound, or a mixture of the polymer granules and of the granules of the chemical compound. The polymer may also be in the form of granules, which are coated with the chemical compound. Another mode of preparation of the composition is slurrying of the various compounds.

It is also possible to introduce the chemical compound into the polymer melt.

According to this fourth embodiment, the temperature during step a) should be sufficient for there to be a reaction between the polymer and the chemical compound, and generation of gas.

A combination of the various embodiments described above may be used to prepare the expandable composition of the process of the invention.

The expandable composition may comprise additives such as surfactants, or nucleating agents, for instance talc, plasticizers, etc. These additives are known to those skilled in the art.

The expandable composition may also comprise other compounds, such as reinforcing fillers, for instance glass fibers, matting agents, for instance titanium dioxide or zinc sulfide, pigments, dyes, heat or light stabilizers, bioactive agents, antisoiling agents, antistatic agents, flame retardants, etc. This list does not have any exhaustive nature.

In the context of the invention, step a) is advantageously performed in a blending device that can generate a pressure above atmospheric pressure. Step a) is preferably performed in an extruder and more preferentially in a twin-screw extruder.

The expandable composition may be prepared according to a mode described above, and then introduced into the extrusion device used during step a). The composition may be introduced in solid or liquid form, for example in melt form.

The expandable composition may also be prepared in situ in the same extrusion device as that used during step a), before extrusion of the composition according to step a).

For example, when the expandable composition is in accordance with the first or third particular embodiment described above, the gas or, respectively, the volatile compound may be introduced into the sheath or the piston of the extrusion device of step a), comprising the polymer of the expandable composition in melt form.

Step a), which consists in extruding the composition through a die to produce the expansion, is performed in a standard manner known to those skilled in the art.

Step b), which consists in cooling and chopping the expanded material, is advantageously performed using a granulating chopping device arranged at the die outlet. Such a granulating device is known to those skilled in the art. It comprises at least one chopping device opposite the die plate, through which the polymer is extruded, and a cooling device.

The chopping device generally comprises knives, a knife holder and a motor to drive the knife holder. The knife holder is usually rotary.

The cooling device may consist of a device for spraying cold water, located close to the chopping device and the die plate. This is the case for the "hot-chopping" granulators known to those skilled in the art. The chopping device and the die plate may also be arranged in a water-filled chamber. This is the case for the underwater granulators known to those skilled in the art. In this water-filled chamber, the water is generally in circulation and ensures the cooling and transportation of the polymer pearls formed in the chopping device toward a dryer. The drying may be performed using a centrifuge that separates the water and the pearls, or using a cyclone device.

Such underwater granulating devices are described, for example in U.S. Pat. No. 5,059,103.

Cooling of the expanded material especially enables it to be set.

The water of the cooling device my be replaced with another liquid, generally used as solvent.

Advantageously, the cooling in step b) is thus performed using a liquid, preferably with water.

The use of such underwater granulators in the context of the invention makes it possible to obtain pearls based on expanded polymer and having a continuous skin. It also allows the manufacture of pearls with good production efficiency.

The pearl obtained according to the process of the invention advantageously has a diameter of less than or equal to 10 mm and preferably less than or equal to 5 mm. The size of the pearl depends on several parameters: it depends especially on the diameter of the holes of the die, on the extrusion rate and on the chopping frequency.

The pearl obtained according to the process of the invention advantageously has a mass per unit volume of less than or equal to 0.8 $g/cm_3$, preferably less than or equal to 0.5 $g/cm_3$ and even more preferentially less than or equal to 0.3 $g/cm_3$. The mass per unit volume of the pearl of the invention is measured according to the protocol described in the experimental section.

The invention also relates to pearls based on expanded polyamide or polyester and having a continuous skin.

This pearl based on polyamide or polyester advantageously has a diameter of less than or equal to 10 mm and preferably less than or equal to 5 mm.

The pearl based on polyamide or polyester of the invention advantageously has a mass per unit volume of less than or equal to 0.8 $g/cm^3$, preferably less than or equal to 0.5 $g/cm^3$ and even more preferentially less than or equal to 0.3 $g/cm^3$. The mass per unit volume of the pearl based on polyamide or polyester of the invention is measured according to the protocol described in the experimental section.

The pearls based on expanded polymer of the invention may be used in the form as produced, in many fields, such as construction or aeronautics, for example as a lightening structure. They may also be introduced into a molding device, for example for thermocompression molding.

Other details or advantages of the invention will emerge more clearly in the light of the examples given below and with reference to the attached figures, which do not constitute a limitation to the invention.

Measurement of the Mass Per Unit Volume of the Pearls

The volume of the pearls is estimated by water displacement according to the following protocol;
a graduated conical flask of size suited to the size of the pearls is filled with water up to the rim, which corresponds to a volume V1 of water. The mass of the flask+water assembly is measured, and is noted as M1. The water is emptied from the flask. The flask is filled with a given mass m1 of pearls. The flask is again filled with water up to the rim. The filling is performed while taking care to ensure, using a metallic grille, that the filled volume is identical to V1 despite the presence of pearls at the surface. The mass of the flask+water+pearl assembly is measured, and is noted as M2. The mass per unit volume of the pearl is then equal to $[m1/(M1-M2+m1)]+d_{water}$ in $g/cm^3$ ($d_{water}=1$ $g/cm^3$).

EXAMPLES

Example 1

A mixture of PA66 granules sold by the company Rhodia Technical Fibers under the reference 132J00® (90% w/w) and of polycarbonate granules sold by the company Bayer under the reference Makrolon 2207® (10% w/w) is introduced into a twin-screw extruder sold by the company Leistriz under the name TSA-EMP 26-35®), equipped with an underwater chopping system sold by the company Gala under the reference LPU Mod 5. The temperature profile on the heating elements of the twin-screw extruder are (in ° C.) 270-280-280-280-280-280, the adaptor is maintained at 272° C. and the die is heated to 330° C. The spin speed of the screws is set at 201 rpm. The extrusion rate is 15 kg/h. The die is composed of a single orifice 2.4 mm in diameter. The chopping water is maintained at 85° C.

The knife holder comprises two knives and the chopping frequency is 2800 rpm.

Rigid expanded polyamide granules with a density of 0.6 $g/cm^3$ are obtained via this method.

Figure 1:
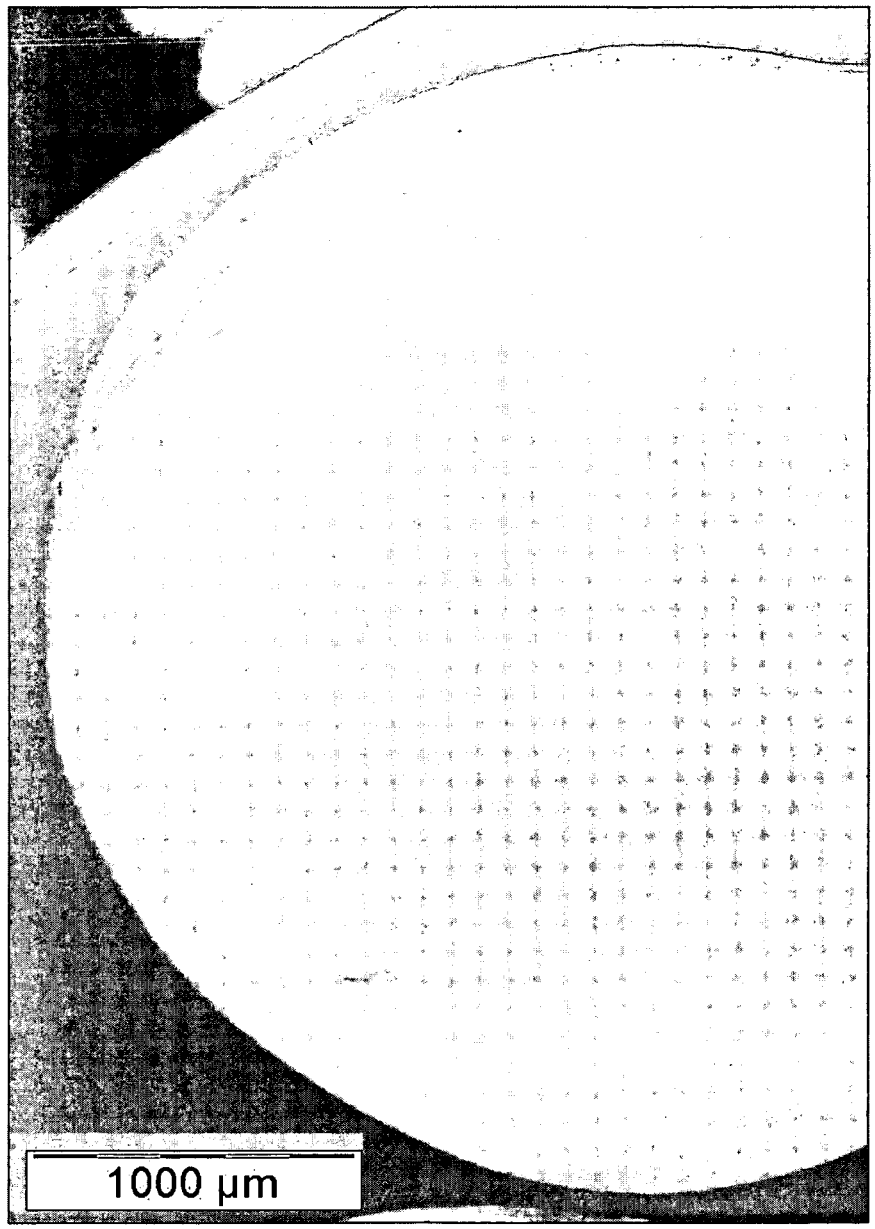
FIG. 1 shows a top view of the pearl of the invention, observed with a scanning microscope.

FIG. 1 shows a top view of the pearl of the invention, observed with a scanning microscope. The continuous skin of the pearl may be seen in this figure.

Figure 2:
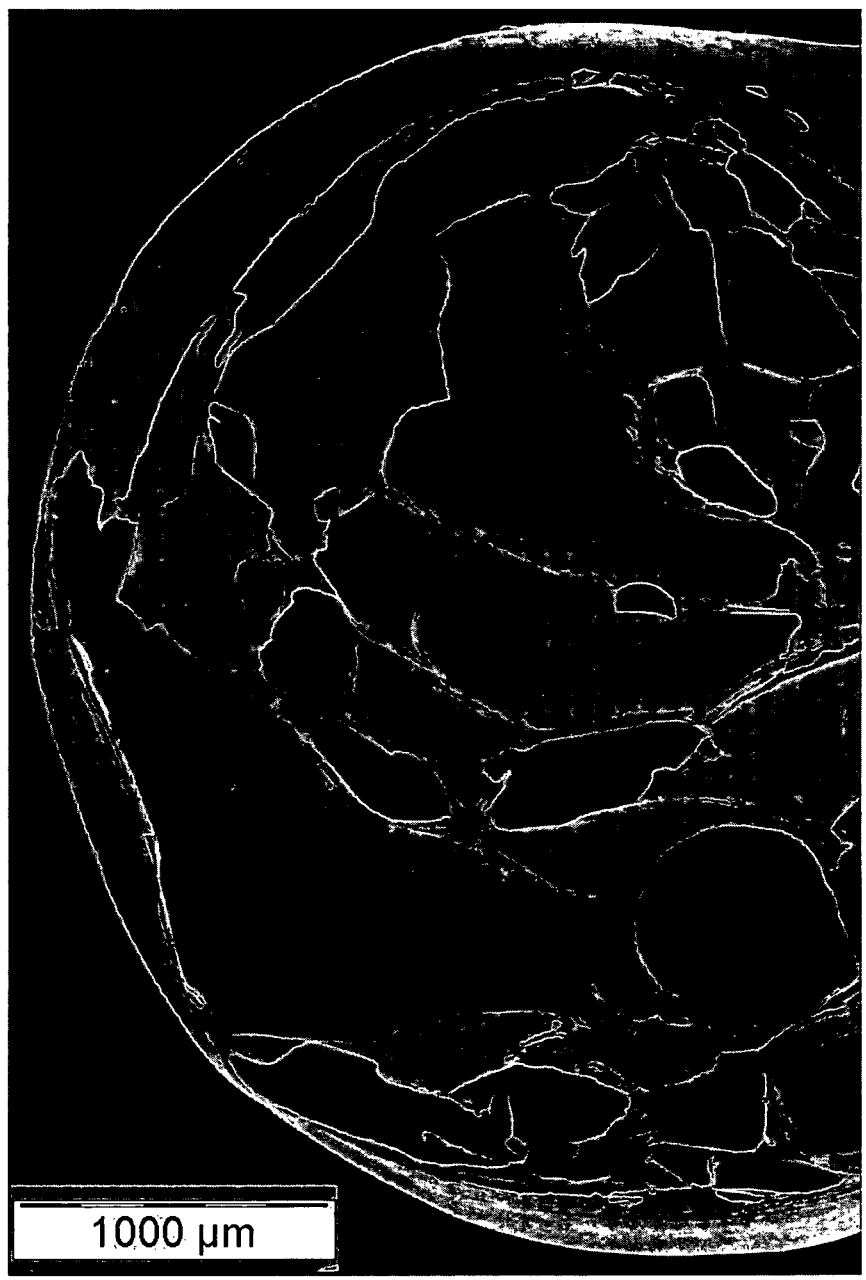
FIG. 2 shows a view in cross section of the pearl of the invention, observed with a scanning microscope.

FIG. 2 shows a view in cross section of the pearl of the invention, observed with a scanning microscope. The continuous skin of the pearl and its internal porosity may be seen in this figure.

Example 2

A mixture of PET granules sold by the company Wellman under the reference Permaclear VI 84® (85% w/w) and of polycarbonate granules sold by the company GE Plastics under the reference Lexan 121-111® (15% w/w) is introduced into a twin-screw extruder sold by the company Leistriz under the reference TSA-EMP 26-35®, equipped with an underwater chopping system sold by the company Gala under the reference LPO Mod 5. The temperature profile on the heating elements of the twin-screw extruder is (in ° C.) 280-300-315-335-275, the adapter is maintained at 272° C. and the die is heated to 330° C. The spin speed of the screws is set at 200 rpm. The extrusion rate is 15 kg/h. The die is composed of a single orifice 2.4 mm in diameter. The chopping water is maintained at 85° C. The knife holder comprises two knives and the chopping frequency is 2800 rpm.

Rigid expanded PET granules with a density of 0.7 $g/cm^3$ are obtained via this method.

The invention claimed is:

1. A process for preparing a pearl comprising an expanded polymer, the process consisting essentially of the following successive steps:
    a) extruding an expandable composition comprising a polyamide, as the sole thermoplastic polymer in the expandable composition, and an expanding agent, in molten state, to effect expansion thereof to form an expanded composition, and
    b) cooling the expanded composition, using a liquid comprising water, and chopping the cooled expanded composition to form a pearl having a continuous skin and a density of less than or equal to 0.8 $g/cm^3$,
    wherein the step of cooling and chopping the expanded composition is performed at the die outlet of the extruder and wherein the prepared pearl is spherical with its largest dimension being less than or equal to 15 mm, and the continuous skin is obtained by performing the above successive steps.

2. The process as defined by claim 1, wherein the expanding agent comprises a gas that can disperse or dissolve in the polymer melt.

3. The process as defined by claim 1, wherein the expanding agent comprises a pore-forming agent.

4. The process as defined by claim 1, wherein the expanding agent comprises a volatile compound that can dissolve in the polymer melt.

5. The process as defined by claim 1, wherein the expanding agent comprises a chemical compound that can react chemically with the polymer by heating, to generate a gas.

6. The process as defined by claim 1, wherein the expandable composition comprises a nucleating agent and/or a surfactant and/or a plasticizer.

7. The process as defined by claim 1, wherein the expandable composition comprises reinforcing fillers.

8. The process as defined by claim 1, wherein the pearl obtained has a diameter of less than or equal to 10 mm.

9. The process as defined by claim 7, said reinforcing fillers comprise glass fibers, matting agents, pigments, dyes, heat or light stabilizers, bioactive agents, anti-soiling agents and/or anti-static agents.

10. The process as defined by claim 8, said diameter being less than or equal to 5 mm.

11. The process as defined by claim 1, said density being less than or equal to 0.5 $g/cm^3$.

12. The process as defined by claim 1, said density being less than or equal to 0.3 $g/cm^3$.

13. The process as defined by claim 1, wherein the temperature of chopping water is about 85° C.

* * * * *